(12) United States Patent
Vetillard et al.

(10) Patent No.: US 7,338,013 B2
(45) Date of Patent: Mar. 4, 2008

(54) FLOOR FOR AIRCRAFT

(75) Inventors: Alban Vetillard, Fonsegrives (FR); Emmanuel Parro, Toulouse (FR); Frederic Leclerc, Pechbusque (FR)

(73) Assignee: Airbus France, Toulouse (FR)

( * ) Notice: Subject to any disclaimer, the term of this patent is extended or adjusted under 35 U.S.C. 154(b) by 140 days.

(21) Appl. No.: 11/143,896

(22) Filed: Jun. 3, 2005

(65) Prior Publication Data

US 2006/0006284 A1    Jan. 12, 2006

(30) Foreign Application Priority Data

Jul. 8, 2004    (FR) .................................. 04 07627

(51) Int. Cl.
   *B64C 1/00*    (2006.01)
(52) U.S. Cl. ................. 244/117 R; 244/118.1
(58) Field of Classification Search ............ 244/117 R, 244/119, 118.1, 100 R, 118.2
   See application file for complete search history.

(56) References Cited

U.S. PATENT DOCUMENTS

| 4,479,621 | A | | 10/1984 | Bergholz |
| 5,222,694 | A | | 6/1993 | Smoot |
| 6,068,214 | A | * | 5/2000 | Kook et al. ............... 244/118.1 |
| 6,427,945 | B1 | * | 8/2002 | Bansemir .................. 244/129.1 |
| 6,554,225 | B1 | * | 4/2003 | Anast et al. ............ 244/117 R |
| 7,163,178 | B2 | * | 1/2007 | Ricaud ..................... 244/118.1 |
| 7,195,201 | B2 | * | 3/2007 | Grether et al. ........... 244/118.1 |
| 2004/0155148 | A1 | * | 8/2004 | Folkesson et al. .......... 244/119 |
| 2006/0231681 | A1 | * | 10/2006 | Huber et al. ................ 244/119 |

* cited by examiner

*Primary Examiner*—Michael J. Carone
*Assistant Examiner*—Benjamin P Lee
(74) *Attorney, Agent, or Firm*—Oblon, Spivak, McClelland, Maier & Neustadt, P.C.

(57) ABSTRACT

This invention relates to a floor (4) for an aircraft, and preferably a cockpit floor, this floor comprising a plurality of spars (14) running along a longitudinal direction (X) of the aircraft and a plurality of cross-beams (16) assembled to the spars and running along a transverse direction (Y) of the aircraft, the floor also comprising attachment means (64) for assembly onto a sealed bottom (68) of the aircraft. According to the invention, the attachment means comprise a plurality of fasteners (66) each comprising at least one junction element with two opposite ends, each of the two opposite ends being articulated about an axis parallel to the (Y) direction.

19 Claims, 7 Drawing Sheets

FLOOR FOR AIRCRAFT

TECHNICAL FIELD

This invention relates in general to an aircraft floor, and more particularly to an aircraft cockpit floor comprising particularly a plurality of spars assembled to a plurality of cross-beams.

STATE OF PRIOR ART

The shape of an aircraft cockpit floor is adapted to the narrowing of the fuselage that occurs in this part of the aircraft, in a known manner, in the sense that its width reduces towards the forward part of the aircraft.

Furthermore, this type of floor can extend towards the aft part as far as a cabin part of the aircraft, and more generally forms the floor of the entire nose part of the aircraft.

This type of floor is then designed to satisfy several specific needs, for example such as the need for openings for integration of rudder bars and the cockpit central console, so that aircraft occupants can move about, various equipment such as electrical elements or seats can be installed, to resist mechanical forces that occur in the case of an aircraft crash, or to electromagnetically isolate the lower portion and the upper part of the aircraft.

Cockpit floors including spars and metallic cross-beams are known in prior art, for example made from aluminium or one of its alloys, so as to achieve good mechanical stiffness. Moreover, the global stiffness of such a floor is reinforced by the presence of boxes obtained by the addition of upper and/or lower metallic plates on a part of the assembly composed of spars and cross-beams.

Note that the boxes located at the side ends of the floor are also used as means of attachment of this floor onto the cockpit fuselage frames and skins. Furthermore, the parts of the assembly not in box form are covered by a honeycomb sandwich type top skin so that in particular aircraft occupants can walk on the floor.

The floor is also provided with attachment means so that it can be assembled on a sealed bottom at the forward end of the cockpit and at the forward end of the aircraft fuselage, these attachment means providing built-in or box type mechanical connections between the floor and the sealed bottom.

However, the presence of these built-in connections causes non-negligible disadvantages that will be explained below.

It is found that the sealed bottom deforms during the different flight phases of the aircraft for various reasons, for example under the effect of severe thermal shocks, and especially during aircraft pressurization phases. The sealed bottom is also mechanically stressed due to this building in, which causes fatigue phenomena at the built-in connections.

Thus, due to building in at the sealed bottom, these deformations are transmitted to the floor that is naturally in turn subjected to associated deformations and stresses. It should be noted that this phenomenon by which deformations are transmitted to the floor, and which takes place at the temperature of the inside of the aircraft, can have the serious consequence that the pilot can feel this floor and/or equipment mechanically connected to this floor moving under his feet.

Another disadvantage relates to the junction between the sealed bottom and the floor. Access to this area is difficult, and a large number of parts have to be used.

Naturally, these disadvantages are also true for the aircraft floor connected in the aft part to a sealed bottom near the aft part of the fuselage of this aircraft.

OBJECT OF THE INVENTION

Therefore, the purpose of the invention is an aircraft floor that at least partially overcomes the disadvantages mentioned above relative to embodiments according to prior art.

To achieve this, the object of the invention is an aircraft floor, preferably a cockpit floor, this floor comprising a plurality of spars running along a longitudinal direction of the aircraft and a plurality of cross-beams assembled to the spars and running along a transverse direction of the aircraft, the floor also comprising attachment means for assembly onto a sealed bottom of the aircraft, this sealed bottom being located near the forward part of the cockpit when the invention is applied to a cockpit floor. According to this invention, the attachment means comprise a plurality of fasteners each comprising at least one junction element with two opposite ends, each of the opposite ends being articulated about an axis parallel to the transverse direction.

Thus, it should be understood that this type of fastener used allows the sealed bottom to deform freely, for example under the effect of thermal stresses or during aircraft pressurization phases, without the deformations that occur being transmitted to the floor.

In other words, the fact of articulating the junction element(s) at both ends along the transverse axes means that the fasteners of the attachment means can each be designed so as to resist only forces applied along a vertical direction of the aircraft. In this respect, it should be noted that in the case of an aircraft crash, these attachments will not resist forces transmitted to the floor in the longitudinal direction, this function then being assured by other means not detailed in this application.

Advantageously, in this invention, the small number of parts and the principle of a junction tolerant to manufacturing and assembly faults jointly facilitate integration of this junction.

Preferably, each fastener in the attachment means comprises a first connection element fixed to a primary structure of the floor formed from an assembly of spars and cross-beams, and a second connection element designed to be fixed to the sealed bottom. In this case, each junction element is then articulated at one of its two opposite ends to the first connection element, and the other of its two opposite ends is articulated to the second connection element.

Naturally, the first connection element fixed to the primary structure could be mounted directly on this structure, or it could be added on indirectly for example by being installed fixed on a secondary spar, itself fixed to the forward part of this primary structure of the floor.

Preferably, each fastener in the attachment means comprises two junction elements.

Furthermore, each junction element may be a shackle, a connecting rod, or any other similar part.

Preferably, each shackle is oriented generally along a vertical direction of the aircraft such that it is easy to implement the function mentioned above of resisting only forces acting along the vertical direction.

If the invention is applicable to a cockpit floor, the cockpit floor may comprise a plurality of secondary spars running along the longitudinal direction and being fixed to the forward part of the primary structure. With this configuration, it would be possible for a fastener of the attachment means to be installed fixed on the forward side of each of these secondary spars.

Spars and cross-beams jointly form the primary floor structure, and are both preferably made from a composite material. This advantageously results in a significant reduction in the global mass of this floor. For example, the mass reduction compared with conventional solutions according to prior art using metallic materials could be more than 20%.

Furthermore, the cross-beams and spars made from a composite material are advantageously no longer affected by previously encountered risks of corrosion.

Finally, it should be noted that the type of material used in the floor according to the invention is compatible with all specific needs mentioned above, particularly in terms of resisting mechanical forces that occur in the case of an aircraft crash.

Preferably, the spars and cross-beams are made from a composite material based on resin impregnated carbon fibres. This resin used is preferably a thermoplastic resin such as PEEK, PEKK, PPS resin, etc.

Although PEEK resin is preferred due to the high mechanical performances that can be achieved using it, other thermoplastic resin types could be used, such as the so-called PPS resin mentioned above and obtained by polymerisation of phenylene sulphide. Thermosetting resins could also be used.

Finally, another purpose of the invention is an assembly for an aircraft comprising a sealed bottom and a floor like that described above. In this case, the sealed bottom is either a sealed bottom located in the forward part of the aircraft fuselage, or a sealed bottom located in the aft part of the aircraft fuselage. Nevertheless, it should be understood that the assembly according to the invention also covers a floor fitted with a forward sealed bottom and also an aft sealed bottom, each being connected to the floor in the manner described above.

Other advantages and characteristics of the invention will become clear after reading the non-limitative detailed description given below.

BRIEF DESCRIPTION OF THE DRAWINGS

This description will be made with reference to the appended drawings among which.

DETAILED DESCRIPTION OF A PREFERRED EMBODIMENT

Figure 1:
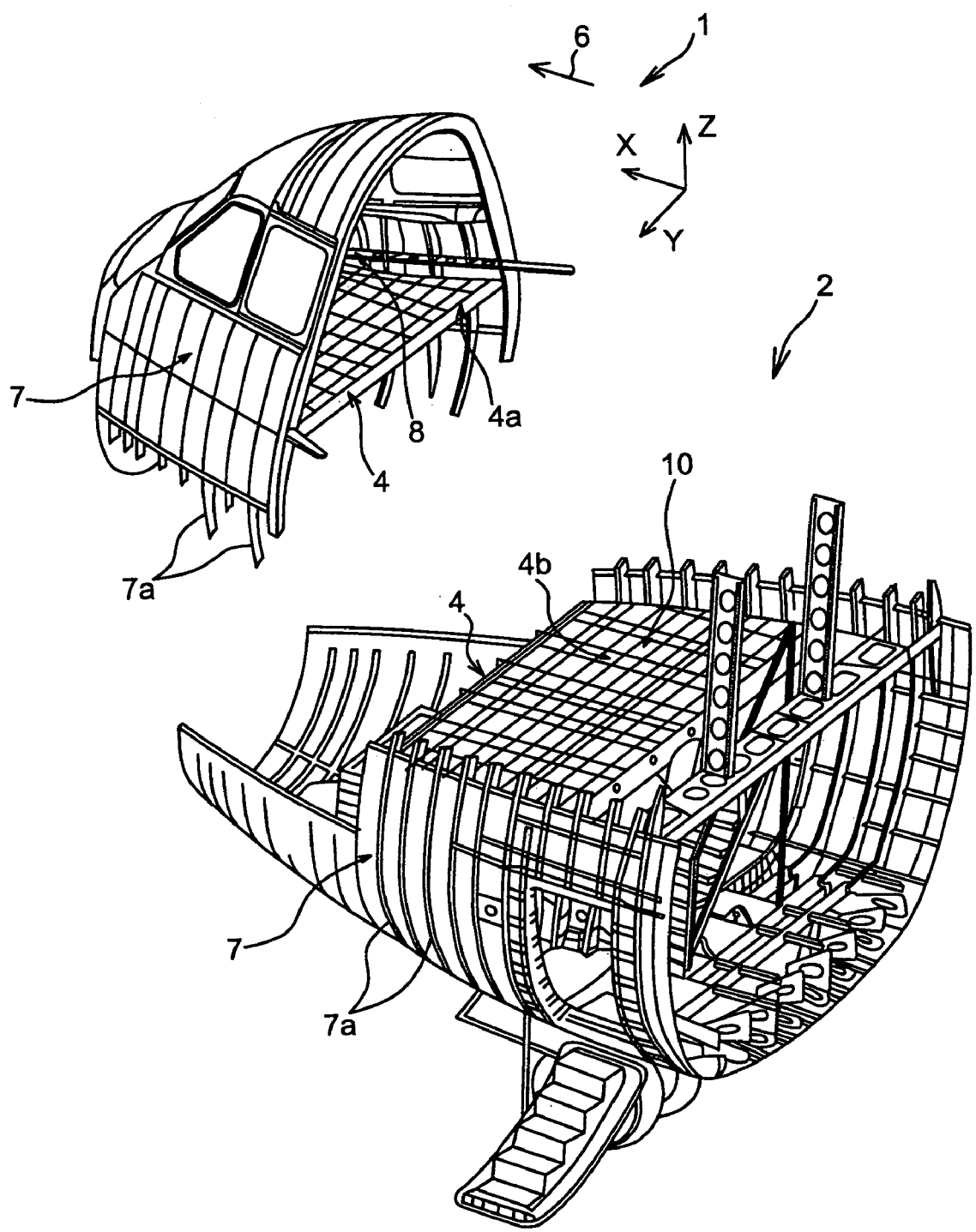
FIG. 1 shows a partially exploded perspective view of the nose part of an aircraft, the aircraft nose comprising a cockpit floor according to a preferred embodiment of this invention.

FIG. 1 shows a partial view of the forward part of an aircraft 1, and more precisely the nose part 2 of this aircraft, comprising a cockpit floor 4 according to a preferred embodiment of this invention.

Throughout the description given below, by convention X denotes the longitudinal direction of the aircraft 1, Y denotes the aircraft transverse direction, and Z denotes the vertical direction, these three directions being orthogonal to each other.

Furthermore, the terms <<forward>> and <<aft>> should be considered with respect to the direction of movement of the aircraft as a result of the thrust applied by the aircraft engines, this direction being shown diagrammatically by the arrow 6.

As can be seen in FIG. 1, the cockpit floor 4 extends in an XY plane over almost the entire length of the nose part 2 of the aircraft, and is installed on a fuselage 7 of the aircraft. The cockpit floor 4 is installed on fuselage frames 7a of the fuselage 7, these frames are at a spacing from each other along the X direction of the aircraft, and are distributed on each side of the floor 4 in the Y direction.

Furthermore, the shape of the floor 4 narrows in the Y direction towards the forward part, due to the narrowing of the fuselage 7 towards the forward direction.

Furthermore, the nose part 2 may comprise a forward cockpit area 8 and an aft cabin area 10, these two areas 8 and 10 normally being separated by a bulkhead (not shown). More generally, the nose part of an aircraft and the cockpit floor extend over about 10% of the total length of this aircraft along the X direction, namely over a few meters, for example from three to five metres. As an illustrative example, when the aircraft is designed essentially to carry freight and/or military equipment, the aft end of its nose part is delimited by an area that will be used for storage of the elements mentioned above.

As shown, the cockpit floor 4 may possibly be designed as two distinct parts designed to be mechanically assembled, the separation between a forward part 4a and an aft part 4b of the floor being located for example at the bulkhead separating the forward cockpit area 8 from the aft cabin area 10. Nevertheless, to facilitate understanding of the invention, it will be considered in the remaining part of the description that the cockpit floor 4 forms a single element extending practically from one end of the nose part 2 of the aircraft to the other.

Figure 2:
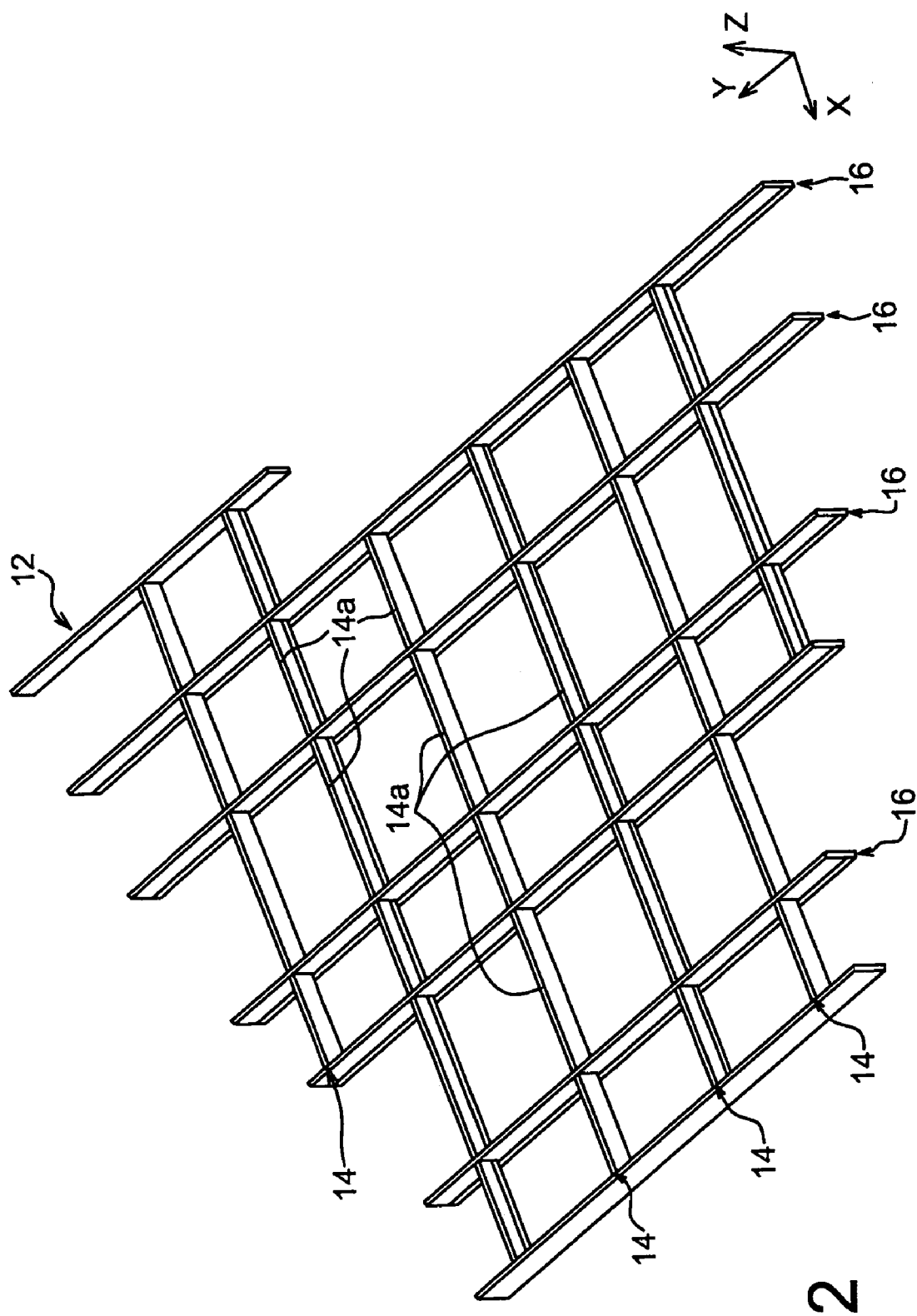
FIG. 2 shows a perspective view of the primary structure of the cockpit floor shown in FIG. 1.

FIG. 2 shows a primary or main structure 12 of the floor 4 shown in FIG. 1, this primary structure 12 being formed from an assembly between a plurality of spars 14 running along the X direction, and a plurality of cross-beams 16 running along the Y direction of the aircraft. It should be noted that this primary structure 12 contributes a significant part of the global stiffness of the cockpit floor 4.

Each spar 14, for example there are six of them, is made from a composite material, and preferably a thermoplastic material made using carbon fibre plies impregnated with PEEK, PEKK or PPS resin.

Each spar 14 then preferably has a C-shaped transverse section like a U-section rotated through 90° that is particularly easy to make using a stamping press, that can also easily be used to make a C section in which the top and bottom flanges and the web of the C are approximately the same thickness, for example between 2 and 5 mm.

Similarly, the cross-beams 16, for example there are seven of them, are also each made from a composite material, preferably a thermoplastic composite material made using carbon fibre plies impregnated with PEEK, PEKK or PPS resin.

Each cross-beam 16 then preferably has a C-shaped cross-section similar to a U-section rotated through 90°, in which the top and bottom flanges and the web of the C are approximately the same thickness, for example between 2 and 5 mm.

Preferably, each cross-beam 16 is made from a single piece and extends in the Y direction over the entire width of the primary structure 12. On the other hand, each spar 14 is actually composed of several spar sections 14a and extends in the X direction over the entire length of the primary structure 12.

More precisely, each section 14a of a given spar 14 is positioned between two directly consecutive cross-beams 16 along the X direction, and has two ends rigidly connected to these two corresponding directly consecutive cross-beams 16.

In this respect, it should be noted that the advantage of such a configuration lies in the fact that the top flanges of the spar sections 14a and of the cross-beams 16 are located in the same XY plane, consequently these top flanges of the C jointly form a plane top surface of the primary structure 12.

Figure 3:
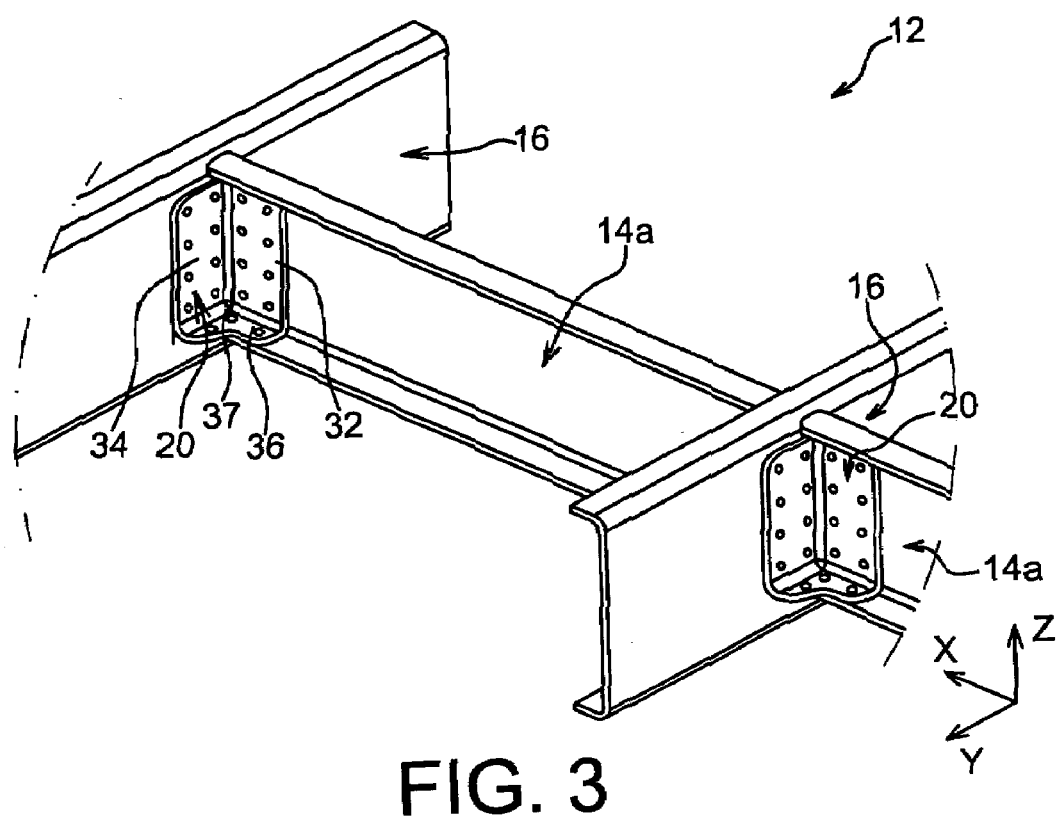
FIG. 3 shows a partial enlarged perspective view of FIG. 2, more particularly showing the assembly between the spar sections and the cross-beams.

FIG. 3 shows that the spar sections 14a are assembled to the cross-beams 16 through junction elements 20 each of which is also made from a composite material, preferably from a thermoplastic composite material made using carbon fibre plies impregnated with PEEK, PEKK or PPS resin.

Globally, each junction element 20 is composed of three plane faces that together form the corner of a cube. In other words, an element 20 comprises a first plane face 32 oriented in an XZ plane, a second plane face 34 oriented in a YZ plane, and a third plane face 36 oriented in an XY plane, each of these three faces having two junction edges (not shown) forming the junction with the other two faces. Furthermore, preferably the three faces 32, 34 and 36 all have the same thickness and all join together in an approximately rounded area 37.

Figure 4:
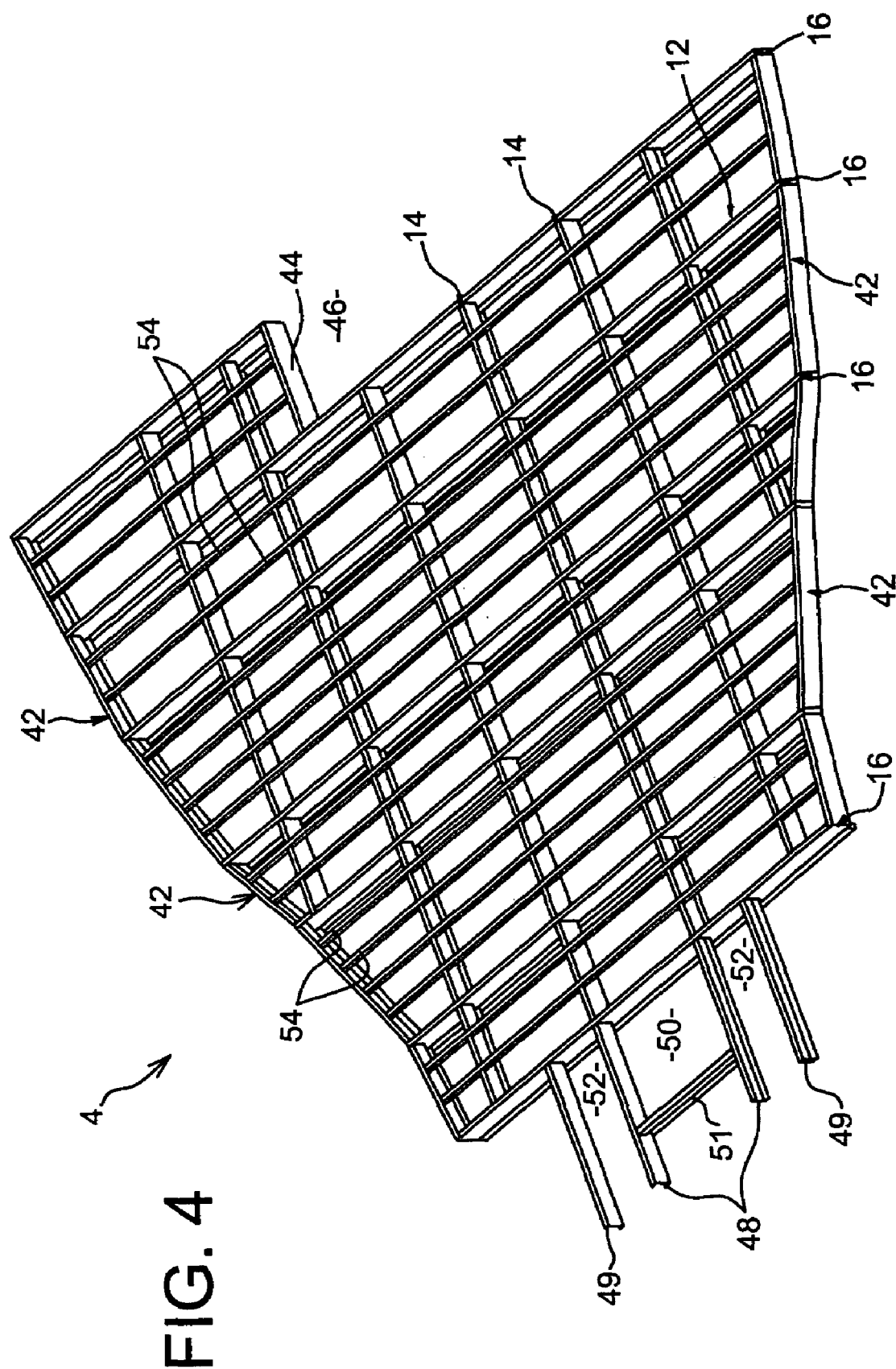
FIG. 4 shows a partial perspective view of the cockpit floor shown in FIG. 1, said floor being shown without its skin.

FIG. 4 shows part of the cockpit floor 4, this floor 4 comprising the primary structure 12 on which peripheral spars 42 were assembled, these spars being identical to or similar to spar sections 14a in the primary structure. As can be seen clearly in FIG. 4, the peripheral spars 42 can be used to connect the ends of cross-beams 16 in the primary structure 12 to each other in pairs.

As an illustrative example, it should be noted that the floor 4 is also provided with a small spar 44 located behind the primary structure 12, and cooperates with an aft cross-beam 16 to define an offset 46 in the structure 12, this offset 46 being adapted to contain a staircase (not shown) for which a top step would be close to the small spar 44.

Furthermore, forward secondary spars 48, 49 (preferably four spars) made from a thermoplastic composite material made using PEEK, PEKK or PPS resin and carbon fibre plies, are fixed to the furthest forward cross-beam 16 of the primary structure 12, preferably using junction elements 20 such as those described above.

The two secondary spars 48 located closest to the centre jointly delimit a space 50 in which a central cockpit console (not shown) will fit, and can each be located in line with and prolonging a spar 14 of the structure 12. They can also be connected to each other at the forward end through a small cross-beam 51 that can also support the central console.

Each of the two secondary side spars 49 also cooperates with one of the two secondary spars 48 to delimit a space 52 into which the rudder bars (not shown) will fit, such that the two spaces 52 obtained are located on each side of the space 50 in the transverse direction Y of the aircraft. Furthermore, each of the two secondary side spars 49 is located between the two spars 14 of the primary structure 12, as shown in FIG. 4.

The cockpit floor 4 also comprises stiffener elements 54 that preferably run along the Y direction between the cross-beams 16 of the primary structure 12. For example, the stiffener elements 54 are made from a composite material, preferably a thermoplastic composite material made using PEEK, PEKK or PPS resin and carbon fibre plies, and for example there may be between two and five of them, between two cross-beams 16 directly consecutive to each other in the X direction.

Figure 5:
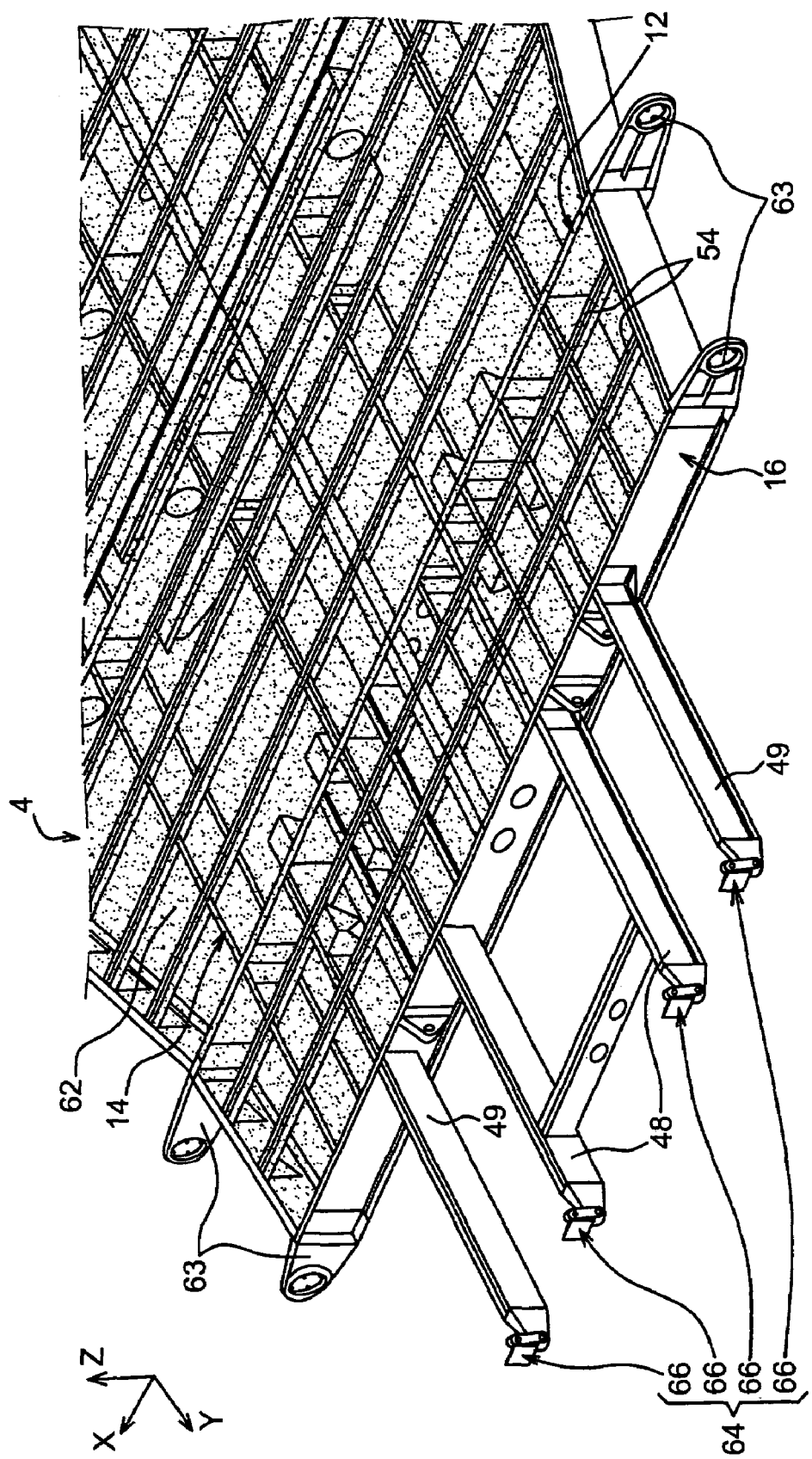
FIG. 5 shows a partial perspective view of the cockpit floor shown in FIG. 1, corresponding to the floor shown in FIG. 4, to which in particular an upper skin has been assembled with attachment means so that it can be assembled on the sealed bottom of the cockpit.

The top parts of the stiffener elements 54 jointly define a top surface that is coincident with the top surface of the primary structure 12, on which a skin 62 will be placed like that shown in FIG. 5.

This skin 62 is rigidly assembled on the spars 14, the cross-beams 16 and on the stiffener elements 54. Note in this respect that these elements 54 are preferably assembled on a lower surface of the skin 62, for example by riveting, before the lower surface of this skin 62 is assembled on the top flanges of the spars 14 and the cross-beams 16.

Once again, the skin 62 is preferably made from a composite material with an approximately constant thickness, and preferably a thermoplastic composite material made using PEEK, PEKK or PPS resin and carbon fibre plies.

In FIG. 5, since the primary structure 12 is not covered by a lower skin, it should be considered that the upper skin 62 only forms half-boxes with the spars 14 and the cross-beams 16.

Also with reference to FIG. 5, it can be seen that the floor 4 is provided with attachment means 63 so that it can be assembled to the fuselage frames 7a mentioned above. Since these means 63 are not within the scope of this invention, they will not be described any further.

The floor 4 is also provided with attachment means 64 so that it can be assembled on a sealed bottom or fuselage sealed bottom (not shown in FIG. 5) of the cockpit, this sealed bottom being globally facing the floor 4 and forward from it.

The attachment means 64 comprise a plurality of fasteners 66 designed so as to resist mainly forces applied along the Z direction, and in the preferred embodiment presented, each fastener is associated with a given secondary spar 48, 49. Therefore there are four of these fasteners 66, and in particular they enable free relative movement between the sealed bottom and the floor 4 in the X direction.

Figure 6:
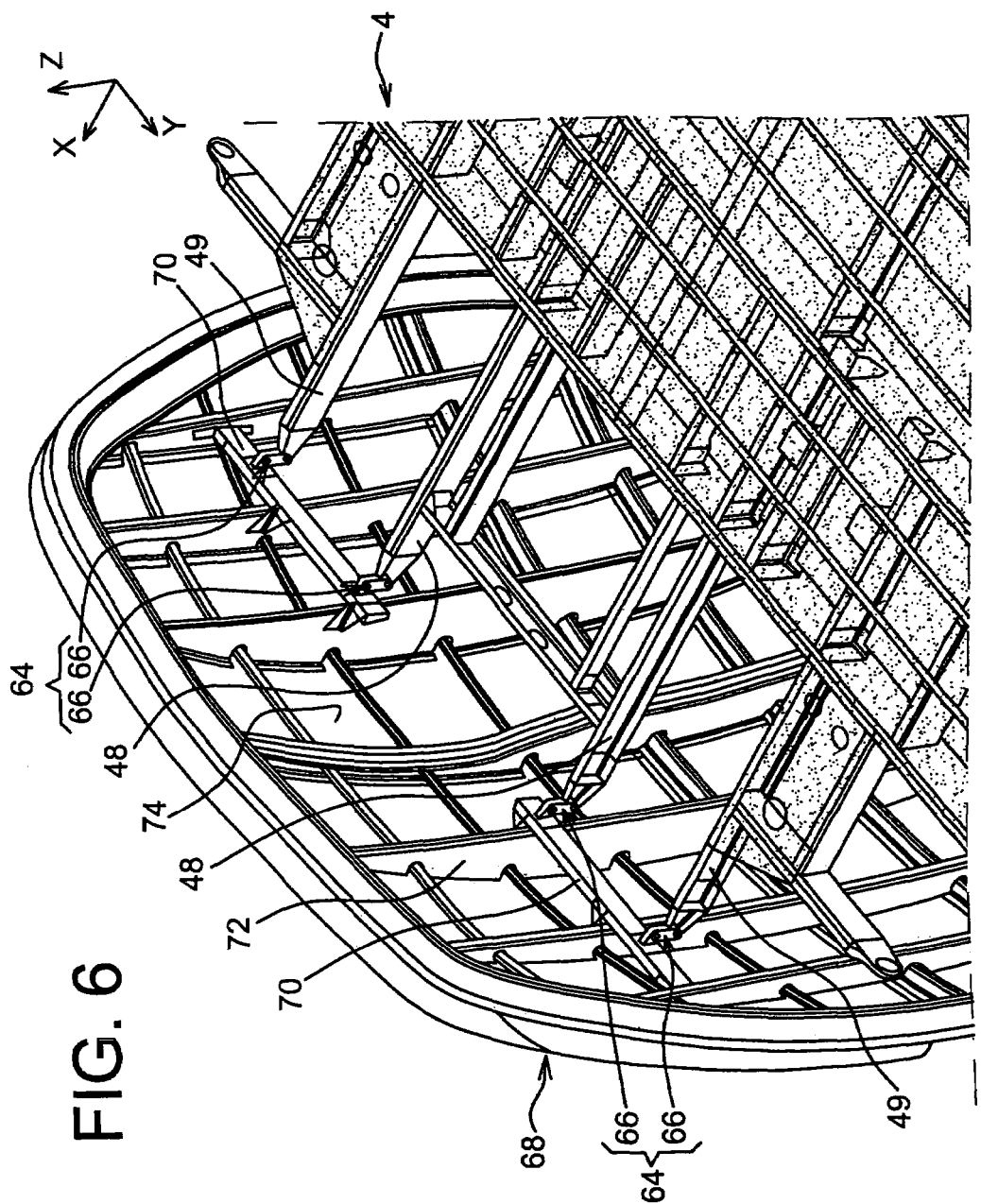
FIG. 6 shows a partial perspective view showing the floor shown in FIG. 5, assembled on the sealed bottom of the cockpit.

Therefore, each of the four secondary spars 48, 49 is equipped with a fastener 66 installed fixed to its free front end, that will also be fixed onto the sealed bottom 68 shown in FIG. 6. For information, remember that the aft end of the secondary spars 48, 49 is installed fixed to the rigid structure 12, and more particularly to the cross beam 16 furthest in the forward direction.

It can be seen in FIG. 6 that the fasteners 66 are all installed fixed on fastener supports 70 belonging to the sealed bottom 68 and in the form of beams oriented along the Y direction, these beams being fixed to sealed bottom stiffeners 72 fixed to a sealed bottom plate 74, and that extend separated from each other along the Y direction, in parallel XZ planes.

Figure 7:
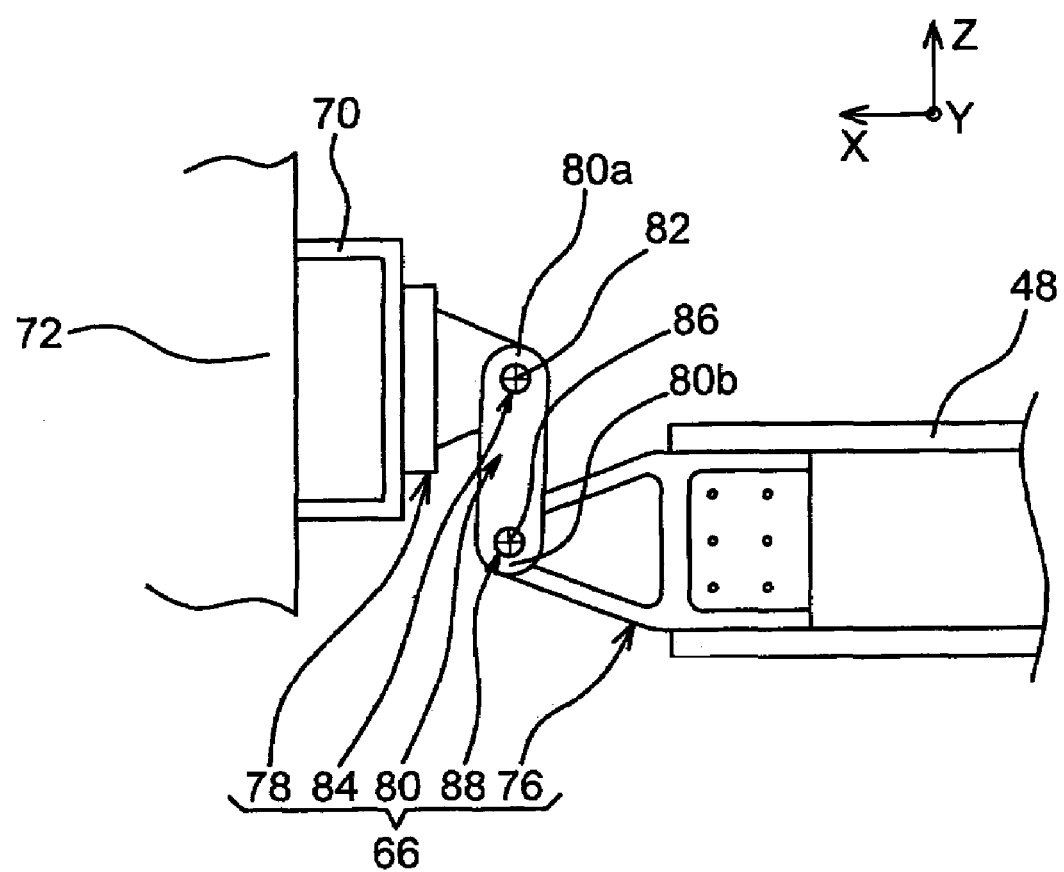
FIG. 7 shows a side view more specifically showing one of the fasteners of the attachment means shown in FIG. 5.

With reference more specifically to FIG. 7 showing one of the four fasteners 66 of the attachment means 64 shown in FIGS. 5 and 6, it can be seen firstly that it comprises a first connection element 76 mounted fixed to the forward end of the secondary spar 48. This connection element 76, that can for example be metallic and is approximately in the direction of an XZ plane, has a through orifice at a forward part (not shown in FIG. 7) along the Y direction, this through orifice projecting forwards from the forward end of the secondary spar 48. For example, this orifice may be fitted with a ring or a ball joint depending on mechanical, assembly and tolerance requirements.

The first connection element 76 is fixed to the secondary spar 48 for example by riveting or welding.

Similarly, the fastener 66 comprises a second connection element 78 installed fixed to its associated fastener support 70, belonging to the sealed bottom 68. This connection element 78, that can for example be metallic, has a through orifice (not shown in FIG. 7) along the Y direction, at an aft part approximately in the direction of an XZ plane, this through orifice naturally projecting in the aft direction from the support 70. For example, this orifice may be fitted with a ring or a ball joint depending on mechanical, assembly and tolerance requirements.

The second connection element 78 is fixed to the fastener support 70 for example by riveting or welding a plate forming part of the second connection element 78, and oriented in a YZ plane. The two connection elements 76, 78 mentioned above are connected together by two junction elements 80 (only one being visible in FIG. 7), that are arranged vertically and are in the form of shackles generally oriented in the XZ planes.

Each of the two shackles 80 is articulated at its upper end 80a about an axis 82 parallel to the Y direction. This articulation is preferably made using a hinge pin or a double hinge pin 84 passing through an orifice formed in the upper end 80a of one of the two shackles 80, the through orifice formed in the second connection element 78, and finally an orifice formed in the upper end 80a of the other of the two shackles 80, all in order in the Y direction.

In this way, the two shackles 80 that are located on each side of the second connection element 78, are each hinged to this same second connection element 78 at their top end 80a.

Similarly, each of the two shackles 80 is articulated at its lower end 80b about an axis 86 parallel to the Y direction. This articulation is preferably made using a hinge pin or a double hinge pin 88 passing through an orifice formed in the lower end 80b of one of the two shackles 80, the through orifice formed in the first connection element 76, and finally an orifice formed in the lower end 80b of the other of the two shackles 80, all in order in the Y direction.

Therefore once again, it should be understood that each of the two shackles 80, that are located on each side of the first connection element 76, is articulated onto this first connection element 76 at their lower end 80b.

It should be noted that although the description provided applies to a fastener 66 comprising two shackles 80 arranged on each side of the connection elements 76, 78, it would also be possible for this fastener 66 to comprise only one shackle or a double shackle (two shackles superposed), without going outside the scope of the invention. Obviously, those skilled in the art could make various modifications to the cockpit floor 4 that has just been described solely as a non-limitative example. In particular, although the detailed description given above refers to a cockpit floor and to the sealed bottom at the forward end of the fuselage, it will naturally be understood that the invention is equally applicable to an aircraft floor located at the aft part of the aircraft, and that is connected to a sealed bottom located near the aft part of the fuselage of this aircraft.

The invention claimed is:

1. A floor for an aircraft, said floor comprising:
   a plurality of spars extending substantially parallel to a longitudinal direction (X) of the aircraft;
   a plurality of cross-beams assembled to said spars and extending substantially parallel to a transverse direction (Y) of the aircraft;
   a plurality of attachment assemblies configured to assemble said floor to a sealed bottom of the aircraft,
   wherein said plurality of attachment assemblies comprise a plurality of fasteners,
   wherein each one of the plurality of fasteners comprise at least one junction element with two opposite ends, and
   wherein each of said two opposite ends are configured to articulate freely about respective axes substantially parallel to said transverse direction (Y);
   wherein each one of the plurality of fasteners comprises a first connection element fixed to a primary structure of the floor formed from an assembly of said spars and said cross-beams, and a second connection element configured to be fixed to said sealed bottom, and
   wherein each junction element is articulated at one of its two opposite ends to the first connection element, and the other of its two opposite ends is articulated to the second connection element.

2. A floor according to claim 1, wherein each one of the plurality of fasteners comprises two junction elements.

3. A floor according to claim 1, wherein each junction element is a shackle.

4. A floor according to claim 3, wherein each shackle is oriented substantially parallel to a vertical direction (Z) of the aircraft.

5. A floor according to claim 1,
   wherein said floor is an aircraft cockpit floor, and
   said sealed bottom is located in a forward part of said aircraft cockpit floor.

6. A floor according to claim 5,
   wherein said aircraft cockpit floor comprises a plurality of secondary spars extending substantially parallel to the longitudinal direction (X), said plurality of secondary spars fixed to a forward part of a primary structure of the floor formed from an assembly of said spars and said cross-beams, and
   wherein at least one of the plurality of fasteners is fixed to a forward part of each of said secondary spars.

7. A floor according to claim 1, wherein said spars and said cross-beams include a composite material.

8. A floor according to claim 7, wherein said spars and said cross-beams include a thermoplastic composite material.

9. A floor according to claim 8, wherein the thermoplastic composite material includes carbon fibre plies impregnated with PEEK, PEKK or PPS resin.

10. An assembly for an aircraft, comprising:
    a sealed bottom; and
    a floor according to claim 1.

11. An assembly according to claim 10, wherein said sealed bottom is a sealed bottom located in a forward part of a fuselage of the aircraft.

12. An assembly according to claim 10, wherein said sealed bottom is a sealed bottom located in an aft part of a fuselage of the aircraft.

13. A floor according to claim 1, wherein said plurality of fasteners are configured to allow free relative movement substantially parallel to the longitudinal direction (X) between the sealed bottom and said floor.

14. A floor according to claim 1, wherein said plurality of fasteners are configured to resist forces substantially parallel to a vertical direction (Z) applied to said floor, and
wherein said plurality of fasteners are not configured to resist forces substantially parallel to the longitudinal direction (X) applied to said floor.

15. A floor according to claim 1,
wherein each one of said plurality of fasteners further comprises a first connection element fixed to the floor and a second connection element configured to be fixed to said sealed bottom,
wherein the at least one junction element comprises two shackles, said two shackles each including a top end and a bottom end,
wherein said two shackles are respectively located on opposite sides of said second connection element,
wherein each top end of said two shackles is hinged to said second connection element and each bottom end of said two shackles is hinged to said first connection element.

16. A floor according to claim 1,
wherein each one of said plurality of fasteners further comprises a first connection element fixed to the floor and a second connection element configured to be fixed to said sealed bottom,
wherein the at least one junction element comprises a double shackle, said double shackle including a top end and a bottom end,
wherein the top end of said double shackle is hinged to said second connection element and the bottom end of said double shackle is hinged to said first connection element.

17. A floor according to claim 1,
wherein each one of the plurality of fasteners includes a first connection mechanism configured to connect the at least one junction element to said sealed bottom and a second connection mechanism configured to connect the at least one junction element to said floor,
wherein said first connection mechanism is configured to allow the at least one junction element to pivot relative to said sealed bottom about a first axis substantially parallel to the transverse axis (Y), and
wherein said second connection mechanism is configured to allow the at least one junction element to pivot relative to said floor about a second axis substantially parallel to the transverse axis (Y).

18. A floor according to claim 1, wherein said plurality of fasteners are configured to allow the sealed bottom to deform freely under thermal stresses or during aircraft pressurization phases.

19. A floor according to claim 1, wherein said plurality of fasteners are configured to prevent a deformation of the sealed bottom under thermal stresses or during aircraft pressurization phases from being transmitted to the floor.

* * * * *